(12) United States Patent
Carpenter (10) Patent No.: US 6,745,245 B1
(45) Date of Patent: Jun. 1, 2004

(54) MANAGING ACCESS TO SET-TOP BOX OBJECTS USING TELEVISION CONDITIONAL ACCESS SYSTEM

(75) Inventor: Wiltse J. Carpenter, San Francisco, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/287,247

(22) Filed: Apr. 7, 1999

Related U.S. Application Data (60) Provisional application No. 60/081,236, filed on Apr. 9, 1998, and provisional application No. 60/112,771, filed on Dec. 18, 1998.

(51) Int. Cl.⁷ .............................................. G06F 15/16
(52) U.S. Cl. ...................... 709/229; 709/225; 709/227; 709/228; 725/110; 380/239; 380/279; 713/155; 713/156; 713/172
(58) Field of Search .............................. 713/200, 201, 713/202, 170, 166–172, 155–156; 709/229, 227, 228, 225; 725/86, 25, 27, 28, 31, 110, 118–119; 380/239–242, 240, 241, 210, 229, 259, 279, 278

(56) References Cited

U.S. PATENT DOCUMENTS

| | | | | |
|---|---|---|---|---|
| 5,815,195 A | * | 9/1998 | Tam .............................. | 725/86 |
| 6,105,134 A | * | 8/2000 | Pinder et al. ................ | 713/170 |
| 6,256,733 B1 | * | 7/2001 | Thakkar et al. .............. | 713/155 |
| 6,418,472 B1 | * | 7/2002 | Mi et al. ...................... | 709/229 |
| 6,493,874 B2 | * | 12/2002 | Humpleman ................. | 725/110 |
| 6,510,519 B2 | * | 1/2003 | Wasilewski et al. ......... | 713/170 |
| 6,516,412 B2 | * | 2/2003 | Wasilewski et al. ......... | 713/168 |
| 6,523,067 B2 | * | 2/2003 | Mi et al. ...................... | 709/229 |
| 6,526,508 B2 | * | 2/2003 | Akins, III et al. ........... | 713/168 |

\* cited by examiner

Primary Examiner—Wellington Chin
Assistant Examiner—Chuong Ho
(74) Attorney, Agent, or Firm—Workman Nydegger (57) ABSTRACT

Methods for using a conditional access system to modify access control information maintained at a set-top box or another client system. The access control information regulates the availability of information or entertainment services at the client or controls the ability of scripts executed at the client to access objects defined at the client. The conditional access system can be a conventional conditional access, such as those used by cable television providers, that has been adapted to modify the access control information. The access control information includes multiple entries, each being referenced by a token identifier. The conditional access system transmits a command and an accompanying token to the client to instruct the client how to modify the access control information. The entry that is to be modified is identified by comparing the token with the token identifiers. By modifying access control information in this manner, the entity that operates the conditional access system is capable of regulating the availability of resources or services at the client. For example, a selected level of a tiered information service can be made available to the client.

20 Claims, 5 Drawing Sheets

| TOKEN IDENTIFIER | OBJECT IDENTIFIER | SCRIPT SOURCE IDENTIFIER | PERMISSION IDENTIFIER | |
|---|---|---|---|---|
| KDAL | DIALING | http://www.microsoft.com/dialing | WRITE | 86a |
| WVCR | VCR | http://www.tci.com/vcr | READ | 86b |
| KNET | INTERNET | http://www.tci.com/tiered-service | WRITE | 86c |
| KEPG | EPG | http://www.webtv.com | WRITE | 86d |

| TOKEN IDENTIFIER ⟵78 | RESOURCE IDENTIFIER ⟵90 | ENABLEMENT STATUS ⟵92 | |
|---|---|---|---|
| KEPG | ELECTRONIC PROGRAM GUIDE | 1 | ⟵88a |
| WPPV | PAY PER VIEW | 1 | ⟵88b |
| KNET | INTERNET ACCESS | 2 | ⟵88c |
| WVCR | VCR CONTROL | 0 | ⟵88d |

(88 braces rows 88a–88d)

MANAGING ACCESS TO SET-TOP BOX OBJECTS USING TELEVISION CONDITIONAL ACCESS SYSTEM

RELATED APPLICATIONS

This application claims the benefit of the following U.S. Provisional Patent Applications: Serial No. 60/081,236, filed Apr. 9, 1998; and Serial No. 60/112,771, filed Dec. 18, 1998. The foregoing provisional patent applications are incorporated herein by reference.

BACKGROUND OF THE INVENTION

1. The Field of the Invention

The present invention relates to controlling the accessibility of resources at a computer system. In particular, the invention relates to using a conditional access system, such as those typically used by cable providers, to modify access control information at client computers, thereby selectively enabling access to or the availability of features of the client system.

2. The Prior State of the Art

During recent years there has been a vast increase in the amount of information available on the Internet and the number of users gaining access to the information. There are also several different ways whereby users can access information on the Internet. One typical technique involves the use of a personal computer equipped with a browser and a telephone modem that allows the computer to use standard telephone lines to access an Internet service provider. There have also been developed set-top boxes that have Internet access capabilities and use a conventional television to display information received from the Internet.

Advanced set-top boxes, which are those that have the ability to access the Internet or to provide other information or entertainment services beyond conventional television, have begun to blur the distinction between conventional television programming and Internet information. For example, viewers can effortlessly switch between viewing a television program and accessing a web site using advanced set-top boxes. The ability to control the information viewed on a television screen and to interactively respond thereto, offers the potential for television viewers to use their television sets to purchase goods, receive customized news, send and receive electronic mail, and perform substantially any other activity that can be performed over the Internet.

For years, cable television providers and digital satellite system (DSS) providers have used conditional access systems to set the level of television service received by customers. For convenience, conditional access systems are primarily discussed herein in the context of cable service providers, although it should be understood that DSS providers and other entities operate comparable conditional access systems. Depending on a programming plan selected and paid for the viewer, the cable operator delivers basic television service, premium channels, pay-per-view, video-on-demand, and other services. In the early days of cable television, when a viewer desired to purchase, say, a premium channel, the cable operator sent a technician to the viewer's home to manually set a switch in the cable television network in the vicinity of the viewer's home, thereby enabling the requested premium channels. Later, cable television providers developed automated conditional access systems that allowed a technician at a central location to control which services were to be received by viewers.

A conventional conditional access system operated by a cable service provider includes set-top boxes in the homes of viewers and a conditional access controller at the cable head end. Each community served by a particular cable service provider might have a single cable head end with its associated conditional access controller. When a customer requests enhanced cable television services, such as a premium channel, a technician at the cable head end enters a code into the conditional access controller. The conditional access controller then electronically transmits a command to the set-top box at the viewer's home via coaxial cable, fiber optics, or another transmission link. The set-top box responds to the command by activating the requested premium channel by, for example, enabling a signal descrambler at the set-top box. Likewise, the cable service provider can deactivate programming services by sending an appropriate command to the set-top box from the conditional access controller.

Including processors, modems, and other components in set-top boxes to allow them to access the Internet has greatly increased the variety and scope of entertainment and information services that can be delivered to viewers from cable television providers, DSS providers, Internet service providers, web sites, and other content providers. With the increase in the number and variety of services available, it has become desirable from a business standpoint to allow subscribers to select which entertainment and information services are received. Permitting subscribers to select which entertainment and information services are to be received could allow content providers to offer a range of service plans, thereby enabling consumers to pay for only the services that are of interest. Those who want enhanced services can pay a premium, while those who want no more than basic service need to pay only a relatively small fee.

There are basic server-based and client-based techniques for enabling an Internet users to have access to a particular level of Internet service, such as unlimited World Wide Web access, hourly access, or simple e-mail access. For example, when an Internet user logs on to an Internet service provider, the Internet service provider can deliver an appropriate level of service and can bill the user on a flat fee basis or an hourly rate based on the identity of the user. This approach to enabling access to selected levels of an information service is based at the server. An alternate, client-based approach uses software at the client for enabling access to selected levels of an information service. The client-based approach requires the service provider to have access to the client software to change access settings in response to the level of service provided by the user.

Neither of these conventional approaches to granting access to a selected level of service of an information service are sufficiently flexible to allow service providers and users to pick and choose from among a large number of information and entertainment services. Neither of these approaches can be easily used by cable television providers in conjunction with set-top boxes, because they require a significant investment in computing resources or they require communication with clients in much different ways than have been traditionally practiced using conditional access systems. Moreover, for cable television providers and other entities that want to maintain control over the activity of set-top boxes or other client systems, the server-based approach is not particularly useful, since the access control activity takes place at the server, while the set-top box is potentially capable of interacting with other servers or content providers.

In view of the foregoing, there is a need in the art to provide access control systems residing primarily at the client that can be easily managed and configured by a cable television provider or another content provider. It would be advantageous to provide such access control systems that could be administered by cable television providers that have conditional access system without requiring the cable television providers make significant investments in computing resources. It would also be an advancement in the art if such access control systems were sufficiently flexible to regulate access of client systems to any desired type of number of resources, entertainment services, or information services.

SUMMARY AND OBJECTS OF THE INVENTION

The present invention relates to using a conditional access system, such as those used by cable television providers and DSS providers, that have been adapted to configure access control information at advanced set-top boxes or other client systems. The access control information can regulate the availability of information and entertainment services, such as Internet access, electronic programming guides, and the like. The access control information can also regulate the ability of scripts received by a client system from a web site to access objects defined at the client system. Controlling the ability of scripts to access or modify objects selectively limits the ability of web sites to control features and properties of client systems. Examples of access control information that can be adapted to function according to the invention are disclosed in co-pending U.S. patent application Ser. No. 09/287,666, filed Apr. 7, 1999, entitled "Set Top Box Object Security System," which is hereby incorporated by reference.

According to one aspect of the invention, a client system maintains access control information that controls the availability of information or entertainment services or the ability of scripts to access objects at the client system. When a remote entity, such as a cable television provider, is to modify the access control information, a conditional access system controller at the remote entity generates a command and an associated token. The command represents instructions whereby the access control information is to be modified or supplemented. The token, as interpreted by the client system, indicates which portion of the access control information is to be modified or supplemented. The conditional access system controller and the communication link connecting the remote entity and the client system can be adapted from conventional conditional access systems that are used to control access to premium channels.

In one implementation of the invention, the access control information stored at the client system includes one or more entries each representing a particular television service, information service, or entertainment service. Each entry has a token identifier that corresponds to the tokens that accompany the commands that are sent from the conditional access system controller. In order to permit conventional conditional access systems to be readily adapted to perform the invention disclosed herein, the tokens can have a format that conforms to a television naming convention. For instance, conventional conditional access systems that regulate access to premium channels typically identify the premium channel by a short code, such as one having four alphanumeric characters. Similarly, a command to enable a particular information service can be accompanied by a token having a small number, such as four, of alphanumeric characters representing the information service. Comparing the identity of the token that accompanies a conditional access command with the token identifiers of the access control information determines which of the entries are to be modified by the command.

Depending on the capabilities of the conditional access system with which the invention is used, the commands can be instructions to change the access control information so as to switch a service on or off, or can be as complex as desired. For instance, the commands can cause an entirely new entry in the access control information, change the access permission granted to selected scripts with respect to objects at the client system, or otherwise modify the access control information.

The techniques of the invention enable cable television providers, DSS providers, and other entities that traditionally use conditional access systems to conveniently regulate the availability of resources, information services, and entertainment services to advanced set-top boxes. Cable television providers who provide advanced set-top boxes to customers do not need to establish an expensive system for controlling the ability of resources at the set-top box in addition to the conditional access system. Adapting a conventional conditional access system to perform the functions disclosed herein can significantly reduce the cost needed to establish enhanced information services through set-top boxes and allows cable television providers to use the billing systems, operator screens, and transmission equipment associated with conditional access systems in novel ways. The access control system of the invention are client-based, in that they employ access control information residing at client systems, yet can be configured by a remote entity.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to systems and methods for using a conditional access system to modify and manage an access control data structure maintained at a set-top box or another client system, thereby controlling the ability of the client system to access resources, to receive information and entertainment services, or to selectively grant or deny scripts access to objects defined at the client system. According to the invention, a cable television provider, a DSS provider or another entity that operates a conditional access system can adapt the conditional access system from its conventional function of enabling premium channels and other enhanced television programming to modifying the access control data structure at the client system.

The invention is described below by using diagrams to illustrate either the structure or processing of embodiments used to implement the systems and methods of the present invention. Using the diagrams in this manner to present the invention should not be construed as limiting of its scope. The embodiments of the present invention may comprise a special purpose or general purpose computer including various computer hardware, as discussed in greater detail below.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
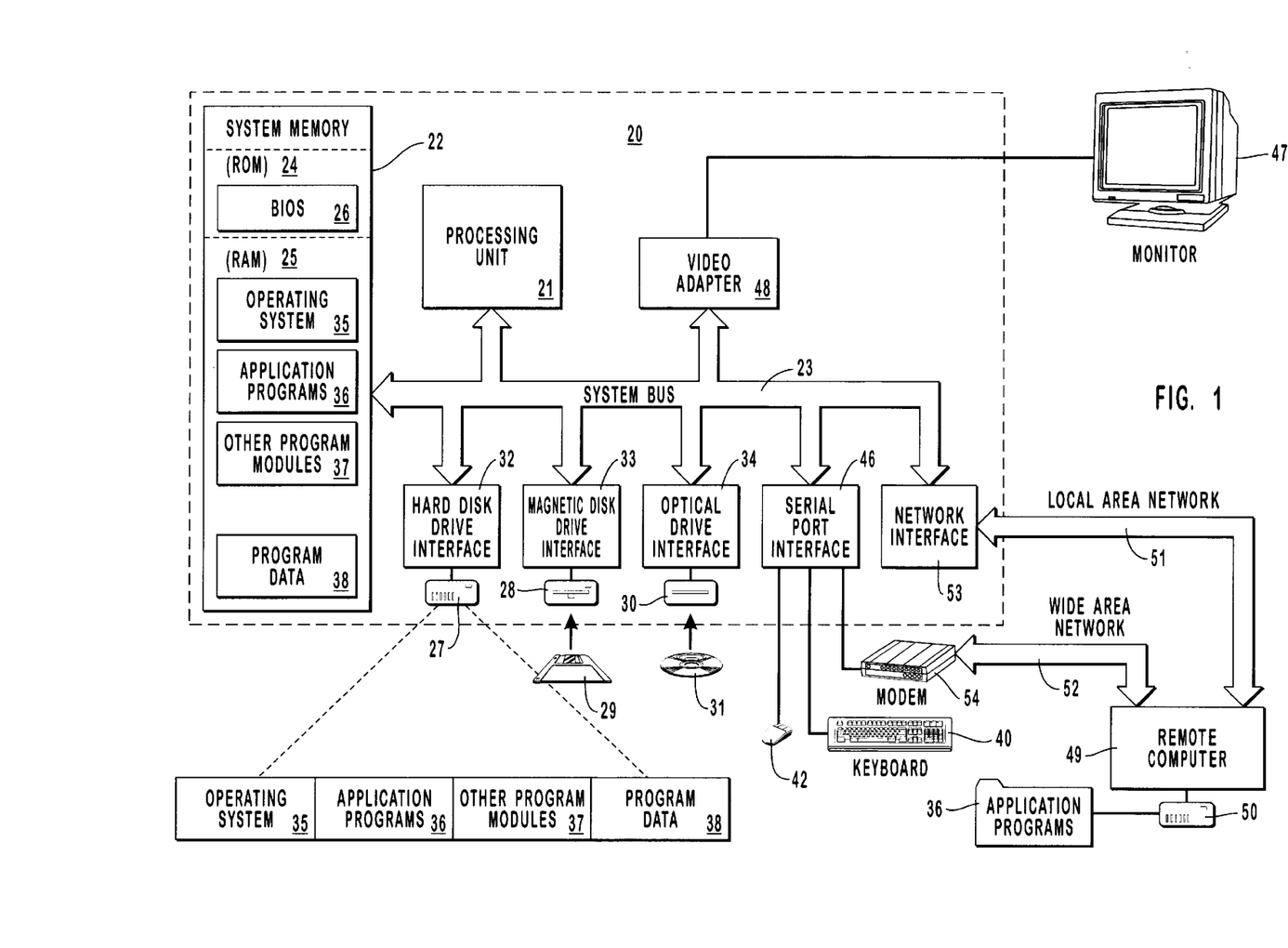
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk, a removable magnetic disk 29 and a removable optical disk 31, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
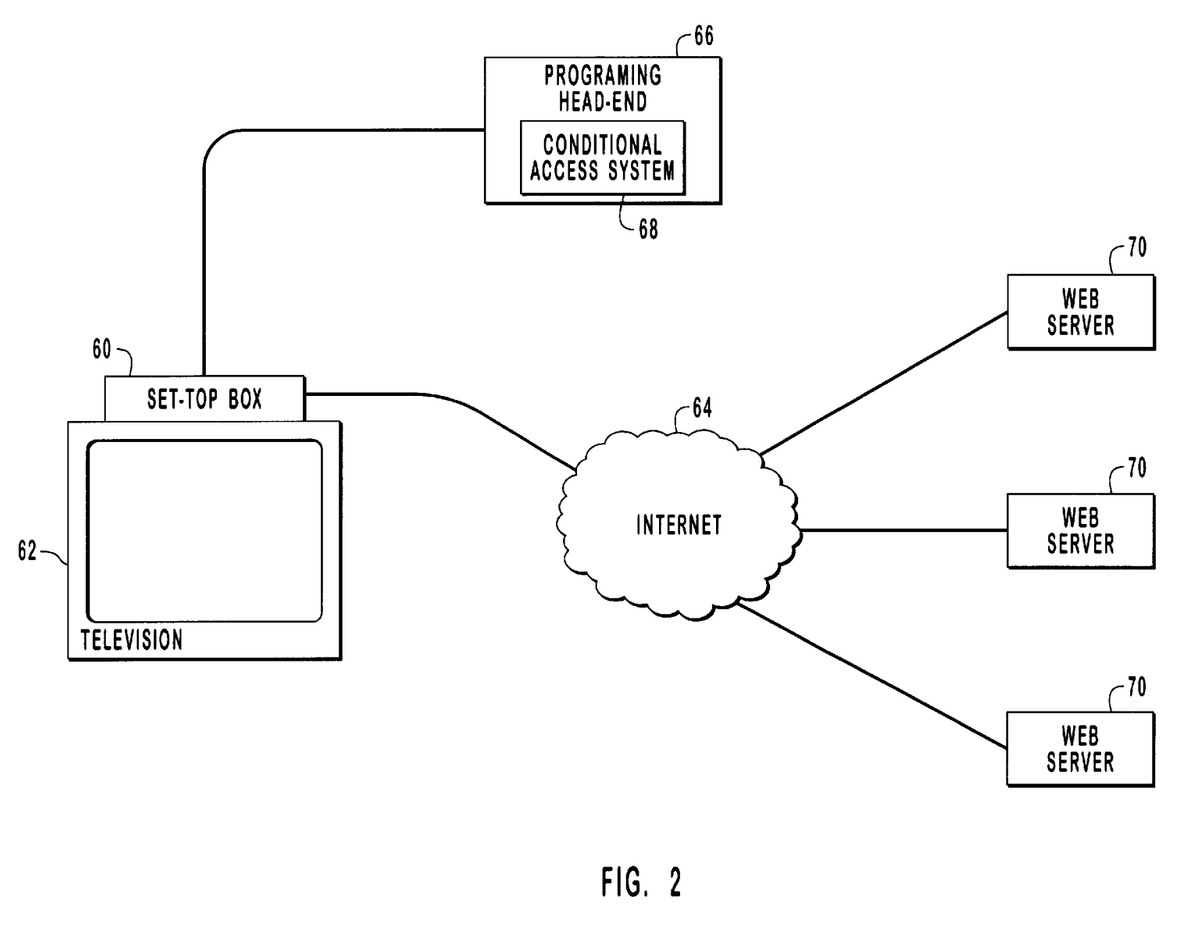
FIG. 2 is a schematic diagram illustrating a suitable network environment in which the invention can be practiced, including a set-top box having Internet access and being linked with a programming head-end.

FIG. 2 is a schematic diagram illustrating a suitable network environment in which can be practiced. In FIG. 2, a set-top box 60 is operated in connection with the conventional television set 62. Set-top box 60 has access to information resources from Internet 64 and television programming from programming head end 66. While set-top box 60 is illustrated in FIG. 2, the invention can be practiced with personal computers and other general purpose or special purpose computing devices that are capable of accessing the Internet or receiving programming from a programming service provider. Therefore, any reference to set-top boxes herein should be understood as being applicable to other computing devices that can access the Internet or receive programming from a programming service provider.

Programming head end 66 represents a generic provider of television programming. The term "programming head end" extends to any centralized location or system that provides television or video programming to viewers, set-top box users, or computer users. The term "programming service provider" includes cable television providers and operators, DSS providers and operators, terrestrial television broadcasters, and the like. The term "content provider", as used herein, extends to any programming service provider, Internet service providers, web sites and web site operators, and any other entity that makes information, television, audio, and the like, available to users.

The term "information services" extends to the Internet, the World Wide Web, private information services, web sites that provide content to users, etc. The term "entertainment services", as used herein, is defined to include television programming and audio, video or multimedia information available over the Internet. "Enhanced" services include those that are available to subscribers for a subscription fee other than basic television, Internet or other service. The invention is compatible with currently-available television programming, information services, entertainment services, and it is anticipated that the invention will be able to be practiced with substantially any such services that may be available in the future.

Programming head end 66 has a conditional access system 68 that has been adapted to perform the processes disclosed herein. Conditional access system 68 can be adapted from conventional conditional access systems used by programming service providers to regulate access to enhanced television services, such as premium channels.

In the network environment illustrated in FIG. 2, set-top box 60 can gain access to web servers 70 and other sources of information by means of Internet 64. Set-top box 60 uses television 62 to display information retrieved from web servers 70. Set-top box 60 can also have access to other sources of information or entertainment services instead of or in addition to programming head end 66 and Internet 64. Furthermore, the system architecture illustrated in FIG. 2 is exemplary, and the invention should not be construed as being limited to the environment illustrated in FIG. 2.

Figure 3:
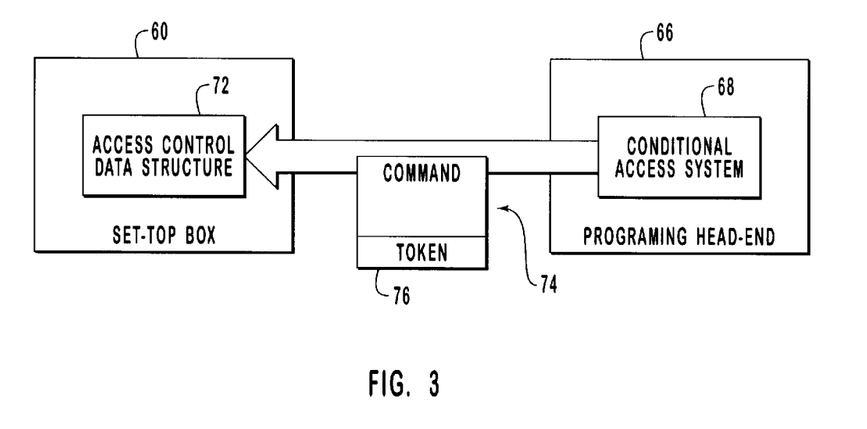
FIG. 3 is a schematic diagram illustrating a command and an accompanying token sent from a conditional access system at the programming head-end to the set-top box.

As shown in FIG. 3, set-top box 60 maintains an access control data structure 72 that regulates the availability of resources to set-top box 60 or to a user of the set-top box As used herein, the term "resources" includes any television programming, information services, entertainment services, and the like. "Resources" further extends to components of set-top box 60, such as peripherals, computing resources, multimedia capabilities, etc. Furthermore, "resources" is a general term that encompasses objects and other data structures defined at the set-top box. "Computing resources", as used herein, represents any resource that requires processing capabilities at a set-top box or another client system other than the activation and descrambling of premium channels, access to pay-per-view, and other enhanced television services traditionally activated by conditional access systems.

Conditional access system 68 at programming head end 66 is used to send commands 74 to set-top box 60 for modifying access control data structure 72 or other access control information. Traditionally, conditional access systems 68 have only been used to turn on or turn off premium channels, pay-per view access, and other such premium television services at set-top boxes. The inventor has discovered that conditional access system 68 and commands 74 can be adapted to control the availability of resources and services at set-top box 60 that are qualitatively different than premium television services. Moreover, the manner in which set-top box maintains access control data structure 72 and responds to commands 74 to modify the access control data structure has not been understood prior to the invention.

Command 74 includes or is accompanied by, according to one embodiment, a token 76 that is interpreted by set-top box 60 to indicate which portion of access control data structure 72 is to be modified or supplemented. Specific examples of access control data structures 72 and the associated commands 74 are described herein in reference to FIGS. 4A through 5C.

In one embodiment, conditional access system 68 operated by programming head end 66 responds to a user request for an enhanced entertainment or information service. In response, an technician at programming head end 66 retrieves subscriber account information on a computer screen and inputs instructions to activate the requested service. The instructions cause billing information associated with the user to be appropriately updated to include the requested service. Command 74 and the accompanying token 76 are transmitted to addressable set-top box 66 by means of the cable wiring that carries the programming signal or a telephone line.

Figure 4A:
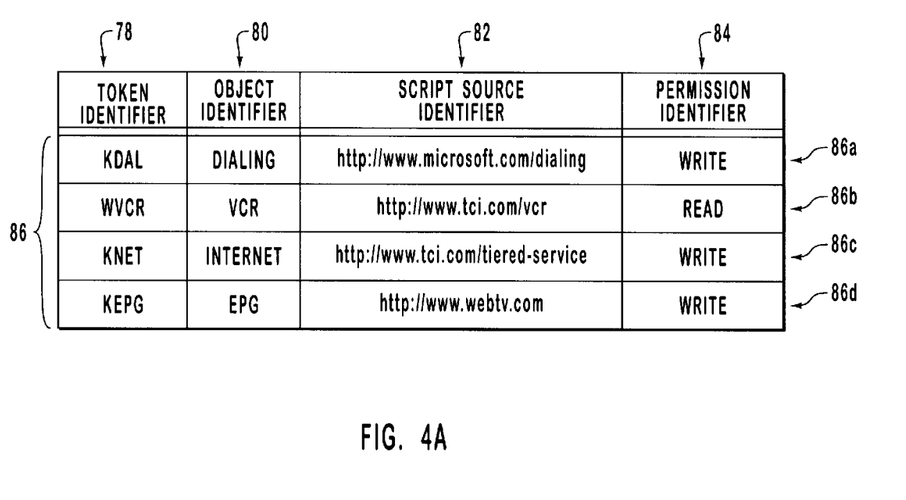
FIG. 4A depicts an example of an access control data structure that can be modified by the conditional access system according to one embodiment of the invention.

FIG. 4A illustrates a representative example of an access control data structure 72 stored in a computer-readable medium at the set-top box to control the ability of scripts received from web sites to access objects defined at the set-top box. Access control data structure 72A can be adapted from the access control data structures disclosed in co-pending U.S. patent application Ser. No. 09/287,666. Access control data structure 72A includes one or more entries 86 each representing an object for which access by scripts is to be controlled. Each entry 86 has a token identifier data field 78 that includes token identifiers corresponding to tokens 76 that accompany commands 74 as shown in FIG. 3. Referring to FIG. 4A, the token identifiers 78 are used by the set-top box, upon receiving a token from the conditional access system, to "look-up" the particular entry 86 that is to be modified by the command from the conditional access system.

In this embodiment, access control data structure 72A further includes an object identifier field 80, a script source identifier field 82, and a permission identifier field 84. The information included in the object identifier field 80 represents one or more objects for which access is to be controlled. The objects can be defined according to the Document Object Model (DOM), ActiveX developed by Microsoft Corporation of Redmond, Wash., an expansion of DOM achieved using ActiveX, or another object model. The information contained by script source identifier field 82 represents the source of scripts whose access is controlled by the entry 86. For instance, source identifier fields 82 of FIG. 4A include Uniform Resource Locators (URL) that identify web sites. Permission identifier fields 84 include a permission that is to be applied to the scripts as they request access to the corresponding object. When a script being executed at set-top box 60 requests access to an object, the set-top box first looks up the entry 86 that specifies the requested object and includes in field 82 the URL from which the script originated. The corresponding permission defined in field 84 is applied to grant or deny the request to access the object. A further description of the use of access control data structures to regulate access of scripts to objects is included in co-pending U.S. patent application Ser. No. 09/287,666.

In this embodiment, the token identifiers included in field 78 have the format that complies with a television channel naming convention that is used by the conditional access system operated by the programming head end. Likewise, tokens 76 of FIG. 3 are also formatted according to the naming convention. While the tokens typically do not represent television channels in this embodiment, this format is used so that the conditional access system operated at programming head end 66 can be used in the manner disclosed herein with minimal modifications.

In FIG. 4A, the objects contained in fields 80 include "dialing", "vcr", "Internet", and "epg". The particular objects included in fields 80 and their properties are not critical to the invention. In this example, the dialing object defines dialing properties by which the set-top box gains access to the Internet or other information services. The vcr object defines, for instance, the ability of the set-top box to operate an associated video cassette recorder in combination with an electronic programming guide to automatically record selected programs. The Internet object defines the level of Internet service that the set-top box is authorized to receive. The epg object specifies the availability or the features of an electronic programming guide. Entry 86A grants write permission to scripts that originate at the URL http://www.microsoft.com/dialing and request the dialing object. Similarly, the other entries 86 of FIG. 4A grant read or write access to scripts originating from the corresponding script sources.

Figure 4B:
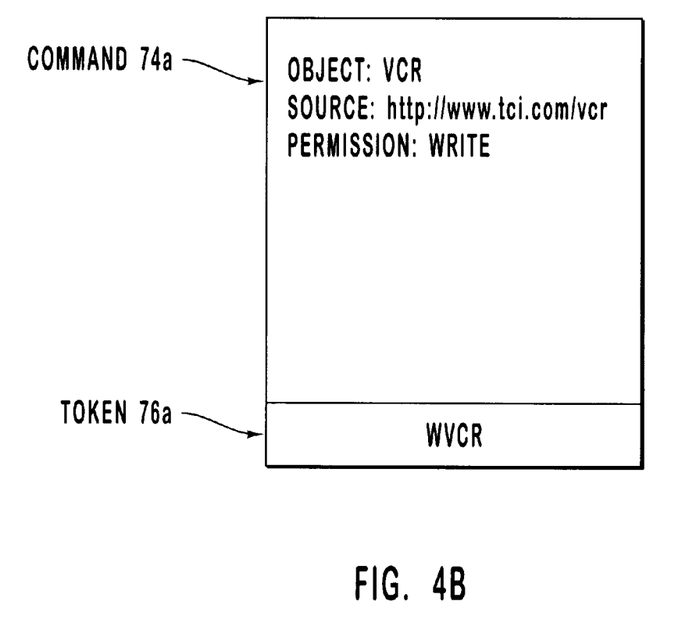
FIGS. 4B and 4C illustrate the contents of examples of commands and accompanying tokens that can be used to modify the access control data structure of FIG. 4A.

FIG. 4B is an example of a command and an associated token sent from the conditional access system at the programming head end to the set-top box. Command 74A instructs the set-top box how the access control data structure is to be modified. The accompanying token 76A identifies which of the entries of the access control data structure is to be modified. When command 74A is received by a set-top box having access control structure 72A of FIG. 4A, the set-top box determines that token 76A (wvcr) matches the information contained in token identifier field 78 of entry 86B. Entry 86B is then modified according to command 74A. In this example, permission identifier field 84 of entry 86B is updated to include the write permission listed in command 74A. In this manner, the programming head end from which command 74A originates is capable of modifying the access control information 72A stored at the set-top box. According to the modification, scripts originating at a web site having the URL http://www.tci.corn/vcr are capable of gaining write access to the VCR object in the manner disclosed in U.S. patent application Ser. No. 09/287,666.

Figure 4C:
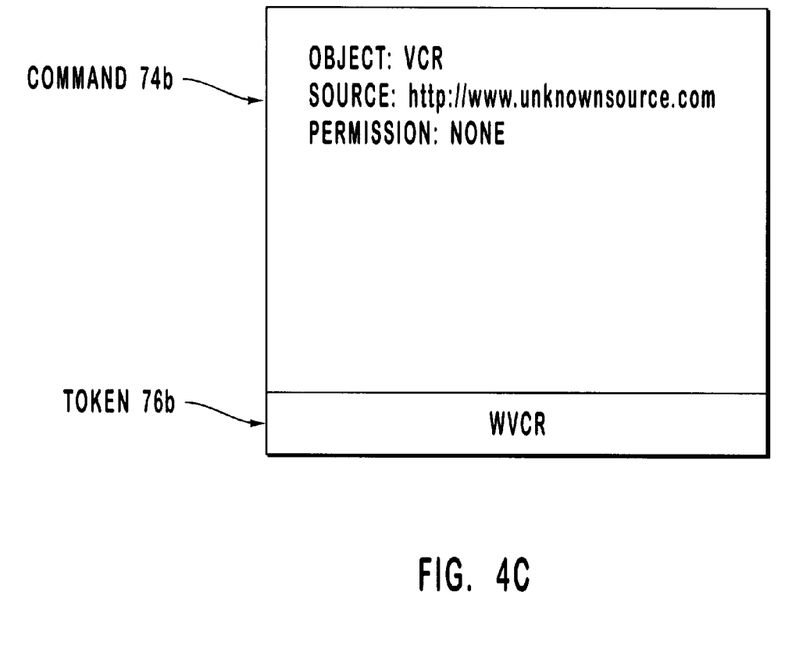

FIG. 4C is another example of a command and an associated token that can be used to update access control information at a set-top box. The set-top box having access control data structure 72A of FIG. 4A determines that no current entry includes an object identifier "vcr" and a script source "http://www.unknownsource.com". The set-top box thus responds to command 74B by creating a new entry in access control data structure 72a having "vcr" in the object identifier field, the URL "http://www.unknownsource.com" in the source identifier field, and "none" in the permission identifier field.

Figure 5A:
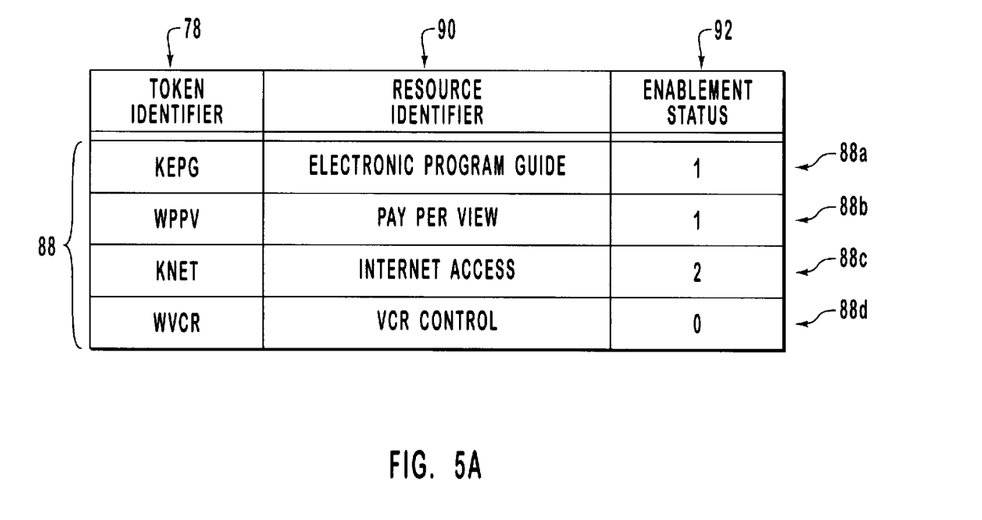
FIG. 5A depicts another example of an access control data structure that can be modified by the conditional access system according to one embodiment of the invention.
Figure 5B:
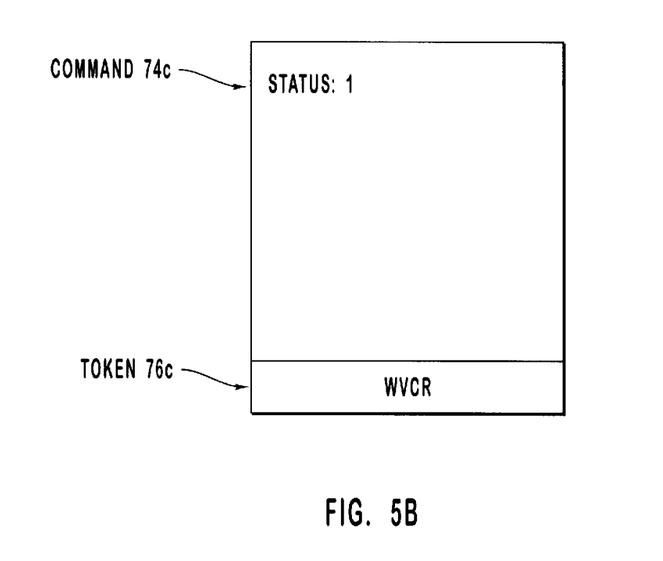
FIG. 5B illustrates the contents of an example of a command and an accompanying token that can be used to modify the access control data structure of FIG. 5A.

The examples illustrated in FIGS. 4A through 4C represent one embodiment of the invention, whereby access control data structures that regulate the ability of scripts to gain access to objects at the set-top box are modified using a conditional access system. In contrast, FIGS. 5A and 5B represent another embodiment whereby the access data control structure enables selected levels of entertainment service, Internet service, or other information services at the set-top box. Access control data structure 72B of FIG. 5A has one or more entries 88A–D, each having a token identifier field 78, a resource identifier field 90, and an enablement status field 92. The information included in the token identifier field 78 serves a similar purpose as the information included in token identifier field 78 of FIG. 4A. The data included in resource identifier field 90 of FIG. 5A references the particular information service or entertainment service that is to be selectively enabled by access control data structure 72B. The pay-per-view resource represents the availability of these services at the set-top box. The other resources are those associated with the corresponding objects listed in access control data structure 72A of FIG. 4A.

Referring again to FIG. 5A, the data contained in enablement status data field 92 represents the level of service activated for the set-top box. A value "0" included in enablement status data field 92 indicates that the associated resource is disabled, while a value "1" represents an enabled service or resource. If the resource is capable of being enabled at more than one level, enablement status field 92 can have other values. For instance, the Internet access service of entry 88c can be activated at various levels, one of which is represented by the value "2".

FIG. 5B is an example of a command and an associated token that can be generated by the conditional access system to modify an entry 88 of access control data structure 72B. Command 74C contains instructions to the set-top box to turn on the resource, namely, the VCR control resource. Alternately, the instructions included in commands 74C can turn off or change the level of an activated resource. The set-top box identifies the resource that, in this case, is to be activated by matching token 76C (wvcr) with the information included in token identifier fields 78 of access control data structure 72B. In this example, token 76C corresponds to entry 88D, such that the enablement status thereof is set to "1". In this manner, the operator of a programming head end can use a conditional access system to selectively activate substantially any resource at set-top boxes.

One set-top box feature that can be conveniently configured by programming providers using conditional access systems as disclosed herein is an Internet "walled garden." Depending on the level of service that the user pays for, the programming provider enables the set-top box to access one of any number of levels of service in a tiered Internet service package. For instance, users can have e-mail access only, access to a limited number of specific web sites, or unlimited web access. Entry 88C of access control data structure 72B of FIG. 5A represents an entry that defines the level of service in an Internet walled garden. This feature has the advantage of allowing the user to pay for only the Internet access that is of interest, resulting in relatively inexpensive limited access and more expensive full access.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a networked system including a client system and a conditional access system, a method of controlling the ability of scripts to access resources at the client system, comprising:

maintaining at the client system an access control data structure for regulating the accessibility of one or more resources, the access control data structure comprising (i) a resource identifier field representing a particular resource for which access is to be controlled, (ii) a script source identifier field representing a script source whose access to the particular resource is to be controlled, and (iii) a permission identifier field representing a permission that is to be applied to one or more scripts from an authorized script source when one or more scripts that are received from the authorized script source request access to the particular resource;

at the client system, receiving from the conditional access system, a scripted command to modify the access control data from a script source; and upon determining that the script sources is authorized to modify the access control data structure, as determined by the script source identifier field, resource identifier field and permission identifier field, modifying the access control data structure as specified by the received command.

2. A method as defined in claim 1, wherein the particular resource is an object encoded in a computer-readable medium at the client system.

3. A method as defined in claim 1, wherein the step of modifying the access control data structure is conducted such that the modified access control information regulates access by the client system to selected Internet resources.

4. A method as defined in claim 1, wherein the step of modifying the access control data structure is conducted such that the modified access control information regulates access by a script at the client system to an object defined at the client system.

5. A method as defined in claim 1, wherein the step of modifying the access control data structure comprises the step of modifying the permission.

6. A method as defined in claim 1, wherein the step of modifying the access control information comprises the step of turning on or turning off an entry or the access control data structure according to the command.

7. A method as defined in claim 1, wherein the step of modifying the access control data structure comprises the step of adding a new entry to the access control structure comprising a new resource identifier field, a script source identifier field, and a new permission identifier field.

8. A method as defined in claim 1, wherein the access control data structure further comprises a token field, and wherein the token field is formatted according to a television channel naming convention associated with the conditional access system.

9. A method as defined in claim 1, wherein modifying the access control data structure comprises adding new information to the access control data structure.

10. A method as defined in claim 1, wherein the particular resource for which access is to be controlled comprises a level of Internet access to be granted to the client system.

11. A method as recited in claim 1, wherein the data control data structure further includes a level of service field defining a level of service of a plurality of levels of service of a tiered information service that are available to the client system, and wherein the command includes instructions to modify the level of service having been selected according to designated criteria.

12. A method as defined in claim 11, wherein the selected level of service enabled by the step of modifying the access control data structure grants the client system access only to specified Internet resources.

13. A method as defined in claim 11, wherein the token is formatted according to a television channel naming convention associated with the conditional access system.

14. A method as defined in claim 11, wherein the step of modifying the access control data structure comprises the step of identifying an entry of an access control data structure stored at the client system, the entry being selected based on the identity of the token.

15. A computer-readable medium having stored thereon a plurality of entries that collectively represent an access control data structure that controls access to computing resources at a client system, wherein the access control data structure is capable of being modified in response to a request generated by a conditional access system, each entry comprising:

a first data field containing data representing a token that may be included in the request generated by the conditional access system and received by the client system to indicate which portion of the access control data structure is to be modified;

a second data field containing data specifying a computing resource at the client system for which access is to be controlled by the access control data structure;

a third data field containing data representing a script source whose access to the computing resource is to be controlled; and a fourth field containing data representing a permission that is to be applied to one or more scripts from an authorized script source when one or more scripts that are received from the authorized script source request access to the computing resource, the data fields being configured to determine whether the one or more scripts received from a script source are authorized to modify the access control data structure.

16. A computer-readable medium as defined in claim 15, wherein the data contained by the second data field represents an object that is defined at the client system and relates to the computing resource.

17. A computer-readable medium as defined in claim 16, wherein a plurality of objects are defined at the client system, the data contained by the second data field representing fewer than all of the plurality of objects.

18. A computer-readable medium as defined in claim 15, further comprising another data field containing data specifying whether the computing resource specified by the data contained by the second data field is enabled or disabled.

19. A computer-readable medium as defined in claim 15, wherein the computing resource represents a selected level of service in a tiered information service.

20. A computer-readable medium as defined in claim 15, wherein the data contained by the first data field is in a format compatible with a television channel naming convention associated with the conditional access system.

* * * * *